US010753206B2

(12) United States Patent
Brettschneider et al.

(10) Patent No.: US 10,753,206 B2
(45) Date of Patent: Aug. 25, 2020

(54) CONTOURING A BLADE/VANE CASCADE STAGE

(71) Applicant: MTU Aero Engines AG, Munich (DE)

(72) Inventors: Markus Brettschneider, Karlsfeld (DE); Inga Mahle, Munich (DE); Fadi Maatouk, Munich (DE)

(73) Assignee: MTU Aero Engines AG, Munich (DE)

( * ) Notice: Subject to any disclaimer, the term of this patent is extended or adjusted under 35 U.S.C. 154(b) by 221 days.

(21) Appl. No.: 15/948,434

(22) Filed: Apr. 9, 2018

(65) Prior Publication Data
US 2018/0298761 A1    Oct. 18, 2018

(30) Foreign Application Priority Data

Apr. 12, 2017  (EP) .................................... 17166316

(51) Int. Cl.
F01D 5/14    (2006.01)
F01D 9/04    (2006.01)

(52) U.S. Cl.
CPC ............ F01D 5/145 (2013.01); F01D 5/143 (2013.01); F01D 9/04 (2013.01); F01D 9/041 (2013.01); *F05D 2220/30* (2013.01); *F05D 2240/11* (2013.01); *F05D 2240/129* (2013.01); *F05D 2240/80* (2013.01); *Y02T 50/673* (2013.01)

(58) Field of Classification Search
CPC .................................. F01D 5/143; F01D 5/145
See application file for complete search history.

(56) References Cited

U.S. PATENT DOCUMENTS

| 8,727,716 | B2 | 5/2014 | Clements et al. |
| 9,051,840 | B2 | 6/2015 | Mitsuhashi et al. |
| 9,453,415 | B2* | 9/2016 | Engel ........................ F01D 5/12 |
| 2012/0201688 | A1* | 8/2012 | Mahle .................... F01D 5/143 |
| | | | 416/235 |
| 2017/0159444 | A1* | 6/2017 | Wolfrum ................ B63H 21/00 |
| 2017/0218769 | A1* | 8/2017 | Venugopal ............. F01D 5/145 |
| 2017/0370234 | A1* | 12/2017 | Brettschneider .......... F01D 5/30 |

FOREIGN PATENT DOCUMENTS

| EP | 2136033 | A1 | 12/2009 |
| EP | 2423444 | A2 | 2/2012 |
| EP | 2487329 | B1 | 11/2013 |
| EP | 2787172 | A2 | 10/2014 |
| EP | 2696029 | B1 | 10/2015 |
| EP | 3064706 | A1 | 9/2016 |

* cited by examiner

*Primary Examiner* — Moshe Wilensky
*Assistant Examiner* — Cameron A Corday
(74) *Attorney, Agent, or Firm* — Barlow, Josephs & Holmes, Ltd.

(57) ABSTRACT

A blade/vane cascade segment of a blade/vane cascade for a turbomachine is disclosed, which comprises a stage with a stage surface as well as a first blade/vane element and a second blade/vane element. The stage surface comprises a first elevation reaching as far as the pressure side of the first blade/vane element and a second elevation reaching as far as the suction side of the second blade/vane element. A furthest downstream point of a boundary of the second elevation has an axial position which differs from the axial position of at least one highest point of the first elevation by a maximum of 10% of an axial cascade span. Furthermore, a blade/vane cascade, a blade/vane channel, a stage, a turbomachine and an aircraft engine are disclosed.

15 Claims, 1 Drawing Sheet

CONTOURING A BLADE/VANE CASCADE STAGE

BACKGROUND OF THE INVENTION

Figure 1:
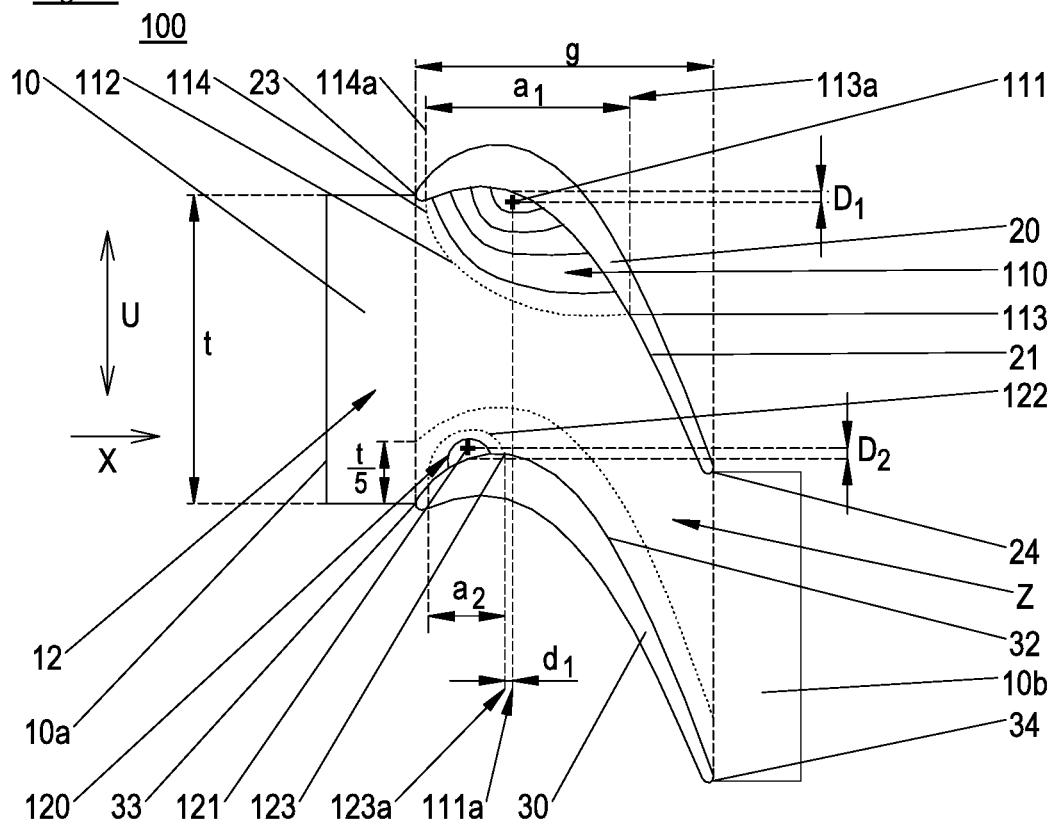

The present invention relates to a blade/vane cascade segment, a blade/vane cascade, a stage, and a blade/vane channel of a turbomachine, as well as a turbomachine.

Turbomachines (such as gas and steam turbines) generally have a flow channel for conducting a fluid. The flow channel, which is also called an "annular space", is bounded radially inward by the shaft of a rotor and radially outward by a casing; the designations "radially" as well as "axially" and "peripheral direction", and terms derived therefrom are to be understood with reference to an axis of rotation of the rotor in this document, as long as nothing is indicated to the contrary.

Blade/vane cascades (for which the term "blade/vane ring" is also common) are arranged in the annular space of a turbomachine. They each comprise guide vanes or rotating blades that lie one behind the other in the peripheral direction at substantially regular distances, as well as stages belonging thereto, which are also called "cover plates", and that usually each have a stage edge on the inflow side and one on the outflow side. These stage edges bound the stage surface in the axial direction; by "stage surface" is meant in this document the surface of the stage facing the annular space.

In this document, the stage edge "on the inflow side" is designated as the stage edge where the leading (axial) principal flow first passes through the annular space of the turbomachine during operation; correspondingly, the stage edge "on the outflow side" is the opposite-lying edge. The indications "downstream" or "upstream", respectively, refer correspondingly to the axial principal flow direction, and thus only to the axial position, regardless of a possible displacement in the peripheral or radial direction: In particular, in this document, a point is to be understood as lying "downstream of the inflow or leading edges" (or "downstream of another point"), if it is arranged displaced axially in/with the direction of principal flow (i.e., following it) relative to a direct connection line between the leading edges (with one another) at the stage surface (or relative to the other point); the same applies to the term "upstream" (with opposite direction).

The section of the stage surface that is bounded in the axial direction by the direct connections (i.e., running in the peripheral direction without axial deviations) of the leading edges or the trailing edges, respectively, of adjacent blade/vane elements at the stage surface and by the pressure side of the one blade/vane element and the suction side of the other one, is called in this document a "blade/vane intermediate strip". The width of the blade/vane intermediate strip in the peripheral direction at the leading edges is called the "pitch distance" (of the blade/vane cascade or a blade/vane cascade segment or the blade/vane elements). It can be measured, in particular, as the distance between the leading edges of adjacent blades/vanes in the peripheral direction in the region of the stage surface. The distance between the leading edges of the blade/vane elements and the trailing edges thereof that is measured (solely) in the axial direction (the direction of the provided axial principal flow) is called (axial) "cascade span".

The pressure side of a blade/vane element and the suction side of an adjacent blade/vane element each bound a so-called blade/vane channel in the peripheral direction. In the radial direction, this blade/vane channel is bounded by so-called side walls within the turbomachine. These side walls are each formed, on the one hand, by the stages, and, on the other hand, by sections lying radially opposite to these stages: In the case of rotating blades, such a side wall is here a radially outer-lying section (in particular, a section of the casing); in the case of guide vanes, it is a radially inner-lying section (in particular, of a rotor hub).

A fluid flow conveyed through a flow channel is periodically influenced by the surfaces of the side walls. Flow layers that run close to these surfaces are more strongly diverted here, due to their slower speed, than flow layers that are further away from the side walls. Thus, a secondary flow that is superimposed on an axial principal flow arises and, in particular, leads to vortexes and pressure losses.

In order to reduce secondary flows, contouring is frequently introduced in the side walls in the form of elevations and/or depressions.

Many of these types of so-called "side wall contouring" are known from the prior art. By way of example, the patents or patent applications of the Applicant will be named: EP 2 487 329 B1, EP 2 787 172 A2, and EP 2 696 029 B1. The last-named publication discloses therein a blade/vane cascade with a side wall contouring that has a pressure-side elevation and a suction-side depression, wherein a highest section of the elevation and a lowest section of the depression lie in a region from 30% to 60% of the extension of the blade/vane elements in the axial direction and differ from one another by a maximum 10% in the axial direction.

Document EP 2 136 033 A1 discloses a side wall contouring in which a depression is arranged between every two blade/vane elements, forming a gutter in the stage surface.

From EP 2 423 444 A2 there is known a side wall contouring in which an elevation is arranged on the pressure side of a first blade/vane element and a depression extends parallel to the suction side of an adjacent blade/vane element. The elevation and the depression form a curved channel in this case.

EP 3 064 706 A1 discloses a series of guide vanes with vane channels of different configuration.

SUMMARY OF THE INVENTION

The object of the present invention is to provide a technique with which secondary flows can be further reduced in an advantageous way in the annular space of a turbomachine.

The object is achieved by a blade/vane cascade segment, a blade/vane cascade, a blade/vane channel, a stage, and a turbomachine according to the present invention. Advantageous embodiments are disclosed in detail below and in the drawing figures.

A blade/vane cascade segment according to the invention for a blade/vane cascade (e.g., a rotating blade cascade or a guide vane cascade) of a turbomachine comprises a stage with a stage surface as well as a first and a second blade/vane element (preferably adjacent to the first one in the blade/vane cascade). The stage surface has a first and a second elevation.

The first elevation reaches as far as the pressure side of the first blade/vane element, i.e., it has a boundary situated at zero level (as compared to an uncontoured stage surface), leading from the pressure side of the first blade/vane element into the blade/vane intermediate strip and back to the pressure side of the first blade/vane element, and at least partly encircling the first elevation in this case. A boundary line between the pressure side of the first blade/vane element and the stage surface may extend at least in one segment on the first elevation (so that the first blade/vane element there rests on the first elevation at its pressure side), or the boundary may form a closed curve, which then coincides in at least one point with the boundary line between the first blade/vane element and the stage surface.

The second elevation reaches as far as the suction side of the second blade/vane element, i.e., it has analogously a boundary situated at zero level (as compared to an uncontoured stage surface), leading from the suction side of the second blade/vane element into the blade/vane intermediate strip and back to the suction side of the first blade/vane element, and at least partly encircling the second elevation in this case. A boundary line between the suction side of the second blade/vane element and the stage surface may thus extend (similar to the above) at least in one section on the second elevation (so that the second blade/vane element there rests on the second elevation at its suction side), or the boundary may form a closed curve, which then coincides in at least one point with the boundary line between the second blade/vane element and the stage surface.

The boundary of the respective elevation extending to zero level may thus entirely encircle the latter on the stage surface or border the elevation together with a section of the boundary line between stage surface and pressure or suction side of the respective blade/vane element.

In a blade/vane cascade segment according to the invention, a furthest downstream point of the boundary of the second elevation differs in its axial position from the axial position of at least one highest point of the first elevation by a maximum of 10% of the axial cascade span (as defined above), i.e., the difference between said axial positions in a coordinate system with an axially extending coordinate axis comprises at most 10% of the (correspondingly measured) axial cascade span.

In this document, an "elevation" is understood to be a local formation (such as, for example, a bulge or projection) in the stage surface, in which the stage surface (as compared to a stage surface of an uncontoured stage, which shall be understood in this document to represent the "zero level") extends radially in the same direction in which the blade/vane elements also project from the stage. For an elevation on a stage bounding the annular space radially on the outside, an elevation thus extends radially inward; for an elevation on a stage bounding the annular space radially on the inside, it extends radially outward.

A "depression" (further below) is understood analogously to be a local formation in the stage surface in the opposite direction (such as, for example, a valley or niche). For an elevation on a stage bounding the annular space radially on the outside, a depression thus extends radially outward; for a depression on a stage bounding the annular space radially on the inside, it extends radially inward.

The designations "elevation" and "depression" (just like terms such as "height", "depth", or the like) are thus here based on an orientation or a coordinate system, in which the blade/vane elements and an elevation each extend toward the "top" from the stage surface. A depression correspondingly extends in the opposite direction toward the "bottom".

The highest and lowest (see further below in the text) points are each to be understood as a point of an elevation or depression, in which the elevation or the depression extends the furthest in the respective direction. The highest and lowest points, respectively, of an elevation or depression can each form a surface area section or a curve or can be a single point. According to an exemplary embodiment, the first and/or the second elevation has/have precisely one highest point.

A blade/vane cascade segment according to the invention can be of one piece or it can be a composite. In particular, the stage can be of one piece or comprise two or more parts, from which each one of the blade/vane elements projects in each case, or the stage can be formed as a separate component that is arranged or can be arranged between the blade/vane elements. Correspondingly, a stage according to the invention is designed to bound a blade/vane element on each side in the peripheral direction, and to form, along with the blade/vane elements (none, one, or both of which can be rigidly molded on the stage), a blade/vane cascade segment according to the invention according to one of the embodiments disclosed in this document. The stage may be designed to be used in the turbomachine with its stage edge on the inflow side (at least substantially) bordering on another (separate) element (such as, for example, the hub or the casing or another blade/vane cascade). The stage edge on the inflow side may be designed to form a section of a wall of a gap through which cooling fluid is or can be introduced into the annular space of the turbomachine.

A blade/vane cascade according to the invention comprises at least one blade/vane cascade segment according to the invention according to one of the embodiments disclosed in this document. A turbomachine according to the invention comprises one or more blade/vane cascade(s) according to the invention.

A blade/vane channel according to the invention leads through a blade/vane cascade segment according to the invention according to one of the embodiments disclosed in this document, and thus it is bounded by such a blade/vane cascade segment and by a side wall situated opposite to the stage thereof (facing the stage surface). In the peripheral direction, a blade/vane channel according to the invention is bounded by the pressure side of one of the blade/vane elements of the blade/vane cascade segment and by the oppositely situated suction side of the other (adjacent) blade/vane element.

A blade/vane cascade segment according to the invention, a blade/vane cascade according to the invention, a blade/vane channel according to the invention, a stage according to the invention, and a turbomachine according to the invention, thanks to the geometry of the stage surface according to the invention, influence the static pressure field at the stage surface and on the blades/vanes in the marginal region. This makes possible a reduction in the secondary flow, especially eddies in the blade/vane channel. Thus, it is possible to reduce losses and improve the flow coming into another blade/vane cascade which is possibly situated downstream.

The blade/vane cascade segment or the blade/vane cascade or the flow channel or the stage, respectively, can be, in particular, part of a low-pressure turbine or designed to be used or installed in a low-pressure turbine. The blade/vane elements can be guide vane or rotating blade elements in each case. The stage can be designed for the purpose of bounding a blade/vane channel by the blade/vane cascade segment radially inward or radially outward.

In one advantageous enhancement of the present invention, the boundary (situated at zero level) of the first elevation has at least one furthest downstream point, which is arranged at least 50% and/or at most 85% (or even at most 65%) of the axial cascade span downstream from the leading edges of the blade/vane elements. It has been shown that this can especially advantageously influence the secondary flow through the blade/vane cascade.

At least one furthest upstream point of the boundary of the first elevation can have an axial position which is arranged at most 10% or at most 5% of the axial cascade span downstream from the leading edges of the blade/vane elements.

An axial extension of the first elevation, i.e., a distance between the axial positions of a furthest downstream and a furthest upstream point of the boundary of the first elevation (situated at zero level), is preferably at least twice as large as an axial extension (correspondingly measured) of the second elevation.

An extension of the first elevation in the peripheral direction, i.e., a maximum distance from the pressure side of the first blade/vane element as measured from all points of the boundary of the first elevation in the peripheral direction, amounts to at most two-thirds or at most half of the pitch distance of the blade/vane cascade segment, and/or at least one-quarter or at least one-third of the pitch distance of the blade/vane cascade segment.

An extension of the second elevation, obtained analogously as a maximum distance from the suction side of the second blade/vane element as measured from all points of the boundary of the second elevation in the peripheral direction, preferably amounts to at most one-fifth or at most one-ninth of the pitch distance of the blade/vane cascade segment.

Thanks to the flow produced by the respective curvatures of the pressure side of the first blade/vane element, and the suction side of the second blade/vane element, channel eddies can be especially effectively reduced in the mentioned extensions of the elevations (alone or in combination).

One variant embodiment has been demonstrated to be advantageous, in which the boundary of the second elevation has at least one furthest upstream point whose axial position is situated at most 10% or at most 5% of the axial cascade span downstream from the leading edges of the blade/vane elements.

A distance measured in the peripheral direction between the at least one highest point of the first elevation and the pressure side of the first blade/vane element and/or a distance measured in the peripheral direction between at least one highest point of the second elevation and the suction side of the second blade/vane element preferably amount to at most 10% or at most 5% of a pitch distance of the blade/vane cascade segment. In particular, a highest point of the first elevation may lie on a boundary line between the pressure side of the first blade/vane element and the stage surface, and/or a highest point of the second elevation may lie on a boundary line between the suction side of the second blade/vane element and the stage surface (so that the mentioned distance measured in the peripheral direction amounts to zero each time). With such a proximity of the highest point to the respective blade/vane element, a gutter on the stage surface between the highest point of the first elevation and the pressure side of the first blade/vane element or between the highest point of the second elevation and the suction side of the second blade/vane element can be formed correspondingly narrow or not at all, which may have a beneficial impact on the secondary flow.

In the peripheral direction between at least one portion of the first elevation and at least one portion of the second elevation, the stage surface area may have a zero-height surface area, thus a surface section that is situated entirely at zero level. In particular, such a zero-height surface area may extend between the first and the second elevation from one stage edge on the inflow side to the stage edge on the outflow side.

According to one advantageous embodiment, the stage surface has a depression which reaches as far as the suction side of the second blade/vane element downstream from the second elevation; a boundary line between the suction side of the second blade/vane element and the stage surface may thus extend (analogously to the above) in a section downstream from the second elevation in the depression (so that the second blade/vane element rests partly in the depression on its suction side) or coincide in at least one point downstream from the second elevation with a boundary of the depression situated at zero level. At least one region of the depression is preferably arranged between the first and the second elevation in the peripheral direction.

The first and/or the second elevation can reach as far as the depression. For example, the first and/or the second elevation can transition into the depression in a region of the stage surface, and thus be separated there (and thus describe a zero-height line) only by a curve (lying on the stage surface). In the axial direction, such a curve separating the first elevation and the depression preferably has an extension of at least 20%, at least 30%, or even at least 50% of the axial cascade span.

Alternatively or additionally, the stage surface can have at least one uncontoured partial surface area (i.e., describing a zero surface area), which separates at least one region of the first and/or the second elevation from the depression in the peripheral direction.

At least one lowest point of the depression may be situated upstream or downstream of at least one highest point of the first elevation or lie substantially on a par with a highest point of the first elevation in the axial direction.

According to one advantageous embodiment, an axial position of at least one lowest point of the depression differs from the axial position of at least one highest point of the first elevation by a maximum of 15% or a maximum of 10% of the axial cascade span (so that the difference between said axial positions in a coordinate system with an axially extending coordinate axis therefore amounts to at most 15% or 10% of the (correspondingly measured) axial cascade span). The lowest point of the depression, the highest point of the first elevation, and the furthest downstream point of the second elevation are thus arranged in a strip of the stage surface extending in the peripheral direction, whose axial width is at most 25% or at most 20% of the axial cascade span.

A furthest upstream point of a boundary of the depression (leading from the suction side of the second blade/vane element into the blade/vane intermediate strip and back to the suction side of the second blade/vane element and situated at zero level) may be preferably situated at most 5% of the axial cascade span downstream from the leading edges of the blade/vane elements, may have basically one axial position in common with the leading edges, or may even be arranged upstream from the leading edges of the blade/vane elements. In particular, the depression upstream of the first and/or the second elevation can reach as far as the first or the second blade/vane element, for example, as far as the leading edge of the element.

BRIEF DESCRIPTION OF THE DRAWING FIGURES

Preferred embodiment examples of the invention will be explained in more detail in the following based on drawings. It is understood that individual features or properties can also be combined in ways other than what is shown. Reference numbers for elements corresponding to one another are used in an overlapping way in the figures and are not newly described for each figure.

Figure 2:
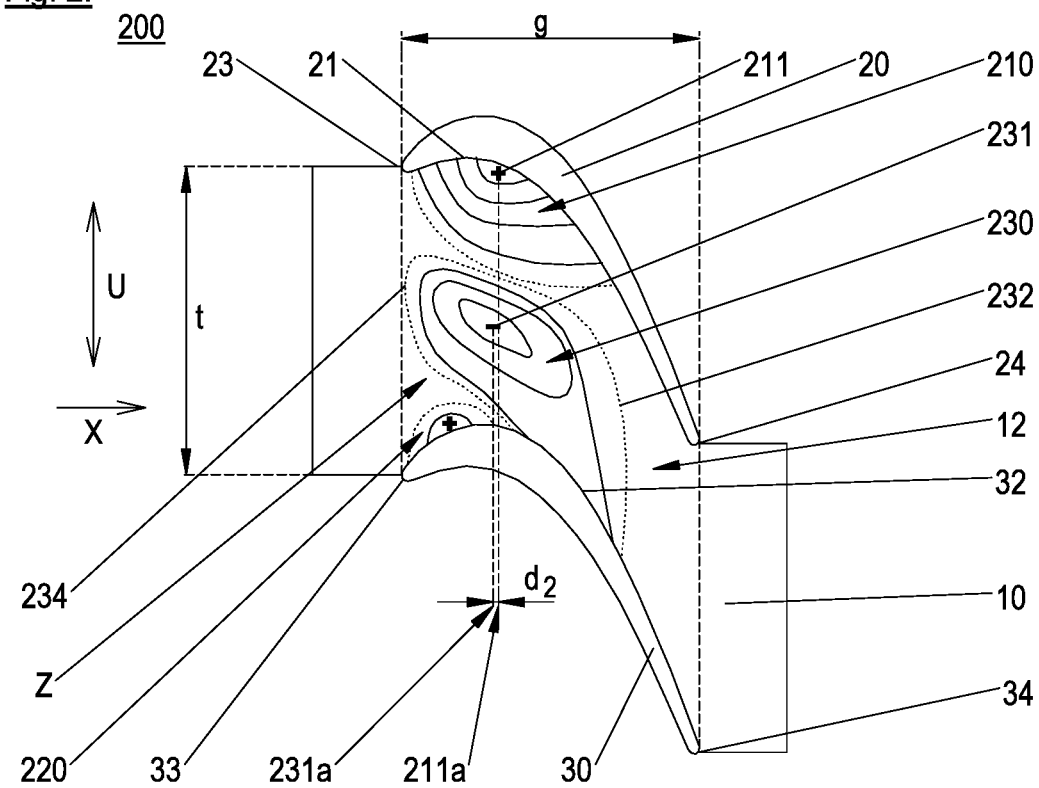

There are shown, schematically:

FIG. 1 shows a blade/vane cascade segment of one exemplary embodiment of the present invention in top view; and FIG. 2 shows a blade/vane cascade segment of an alternative exemplary embodiment of the present invention in top view.

DESCRIPTION OF THE INVENTION

An exemplary, unrolled embodiment of a blade/vane cascade segment 100 according to the invention is shown schematically in FIG. 1 in top view (with radial direction of view). It comprises blade/vane elements 20, 30, each of which has a pressure side and a suction side, as well as a stage 10 according to the invention, with a stage surface 12, a stage edge 10a on the inflow side and a stage edge 10b on the outflow side (relative to the provided principal flow direction X). The stage can be designed as one part or, for example, it can be made of two parts (not shown); in particular, it can comprise two parts, from each of which projects one of the blade/vane elements 20, 30.

The blade/vane elements define a blade/vane intermediate strip Z as the surface section situated in the peripheral direction U between the pressure side 21 of the first blade/vane element 20 and the suction side 32 of the second blade/vane element 30 and bound in the axial direction X on the inflow side by a connection of the leading edges 23, 33 of the blade/vane elements 20, 30 and on the outflow side by a connection of the respective trailing edges 24, 34. The mentioned connections extend on the stage surface 12 solely in the peripheral direction U in this case (i.e., with no deviation in the axial direction), and they have a spacing from each other which corresponds to the axial cascade span g of the blade/vane cascade segment. A pitch distance t is defined as the distance of the leading edges 23, 33 from each other on the stage surface.

In the blade/vane intermediate strip Z, the stage surface 12 comprises a first elevation 110 and a second elevation 120, which are each indicated by contour lines in FIG. 1. The first elevation 110 reaches as far as the pressure side 21 of the first blade/vane element 20 and the second elevation reaches as far as the suction side 32 of the second blade/vane element 30. In the example of embodiment shown, the first blade/vane element 20 even rests on the elevation at its pressure side 21, and so a boundary line runs between the stage surface 12 and the mentioned pressure side 21 partly on the elevation 110. In the example shown, the second blade/vane element 30 rests analogously on the second elevation 120 at its suction side 32.

The first elevation has a boundary 112 at zero level. In this case, the boundary 112 extends from the pressure side 21 of the first blade/vane element 20 into the blade/vane intermediate strip Z and back to the pressure side 21. The boundary 112 and a section of the boundary line between stage surface 12 and pressure side 21 together border the first elevation 110.

Analogously, the second elevation 120 has a boundary 122, which lies at zero level and which starts from a first site on the suction side 32 of the second blade/vane element 30 and leads into the blade/vane intermediate strip Z and to a second site on the suction side 32 of the second blade/vane element. The boundary 122 and a section of the boundary line between stage surface 12 and suction side 32 therefore together border the second elevation 120.

The first elevation 110 has a highest point 111. Measured in the peripheral direction U, the highest point 111 for the blade/vane cascade segment 100 shown in FIG. 1 has a distance $D_1$ from the pressure side 21 of the first blade/vane element 20, where $D_1 \leq t/10$. Thus, the distance $D_1$ in this embodiment amounts to at most 10% of the pitch distance t.

The axial position 111a of the highest point 111 of the first elevation has a distance $d_1$ from the axial position 123a of a furthest downstream point 123 of the boundary 122 of the second elevation 120. According to the invention, in this case, $d_1 \leq 0.1$ g, i.e., the highest point 111 of the first elevation differs from a furthest downstream point 123 of the boundary 122 of the second elevation by a maximum of 10% of the axial cascade span g.

The second elevation 120 in the example illustrated likewise has a highest point 121. Measured in the peripheral direction U, this point 121 has a distance $D_2$ from the suction side 32 of the second blade/vane element 30, where $D_2 \leq t/10$. Thus, the distance $D_2$ in this embodiment amounts to at most 10% of the pitch distance t.

The first elevation 110 has an axial extension $a_1$, determined by the distance of the axial position 114a of a furthest upstream point 114 from the axial position 113a of a furthest downstream point 113 of the boundary 112. The furthest downstream point 113 in this case is arranged at most 85% (or even at most 65%) of the axial cascade span g downstream of the leading edges 23, 33 of the blade/vane elements; the difference between the axial position 113a of the point 113 and the axial position of each of the leading edges is thus at most 0.85 g (or 0.65 g, respectively). The furthest upstream point 114 of the boundary 112 in the exemplary blade/vane cascade segment 100 lies at most 10% of the cascade span g downstream from the leading edges 23, 33 of the blade/vane elements.

The second elevation 120 has an axial extension $a_2$ defined analogously by the axial distance between a furthest upstream point and the furthest downstream point 123 of its boundary 122. In the advantageous embodiment example shown, $a_1 \geq 2a_2$.

In the peripheral direction U, the second elevation 120 extends by less than one-fifth of the pitch distance t. Thus, of all the points of the boundary 122 of the second elevation 120, none has a distance, measured in the peripheral direction, from the suction side that would be greater than t/5; this is indicated in FIG. 1 by a dotted line, which marks a corresponding region on the suction side 32 of the second blade/vane element 30.

As is furthermore evident from FIG. 1, in the peripheral direction U, the first elevation 110 has an extension which amounts to less than half the pitch distance t. Thus, no point of the boundary 112 of the first elevation 110 has a distance from the pressure side 21 of the first blade/vane element 20, measured in the peripheral direction U, which would be greater than or equal to half the pitch distance.

FIG. 2 shows an alternative embodiment of an unrolled blade/vane cascade segment 200 according to the invention in top view (looking in the radial direction). Like the blade/vane cascade segment 100 shown in FIG. 1, it comprises blade/vane elements 20, 30 and a stage 10 according to the invention with a stage surface 12 comprising a blade/vane intermediate strip Z.

The stage surface of the blade/vane cascade segment 200 represented in FIG. 2 has a first elevation 210 reaching as far as the pressure side 21 of the first blade/vane element 20 with a highest point 211 as well as a second elevation 220 reaching as far as the suction side 32 of the second blade/vane element 30. The first and the second elevations 210, 220 of the exemplary blade/vane cascade segment 200 according to the invention, as represented in FIG. 2 in the example shown, are formed the same as the first and second elevations 110, 120 represented in FIG. 1 and are therefore not described further; it is understood that other configurations are equally possible in the context of the present invention.

The blade/vane cascade segment 200 furthermore comprises a depression 230 on the stage surface 12, this depression likewise being indicated by contour lines in the figure, and reaching as far as the suction side 32 of the second blade/vane element 30 downstream from the second elevation 220; in the example shown, a section of the second blade/vane element even rests in the depression 230 at the suction side 32 of the second blade/vane element.

As is shown in FIG. 2, an axial section of the depression 230 may lie between the first elevation 210 and the second elevation 220 in the peripheral direction.

The depression has a lowest point 231. Its axial position 231a has a distance $d_2$ from the axial position 211a of the highest point 211 of the first elevation 210. In the embodiment example shown, $d_2 \leq g/10$, so that the lowest point 231 of the depression differs in the axial direction by at most 10% of the axial cascade span g from the highest point 211 of the first elevation 210.

A boundary 232 of the depression 230 at zero level is indicated by a dotted line in FIG. 2. As is evident from FIG. 2, a furthest upstream point 234 of the boundary lies downstream from the leading edges 23, 33 of the blade/vane elements 20, 30, but in the present case the axial distance from the leading edges is not more than 5% of the axial cascade span g.

Disclosed is a blade/vane cascade segment 100, 200 of a blade/vane cascade for a turbomachine, wherein the blade/vane cascade segment comprises a stage 10 with a stage surface 12 as well as a first blade/vane element 20 and a second blade/vane element 30. The stage surface comprises a first elevation 110, 210 reaching as far as the pressure side 21 of the first blade/vane element 20, and a second elevation 120, 220 reaching as far as the suction side 32 of the second blade/vane element 30. A furthest downstream point 123 of a boundary 122 (situated at zero level) of the second elevation 120, 220 has an axial position 123a which differs from the axial position 111a of at least one highest point 111 of the first elevation 110, 210 by a maximum of 10% of the axial cascade span g.

Furthermore, a blade/vane cascade, a blade/vane channel, a stage, a turbomachine, and an aircraft engine are disclosed.

It would be appreciated by those skilled in the art that various changes and modifications can be made to the illustrated embodiments without departing from the spirit of the present invention. All such modifications and changes are intended to be covered by the appended claims.

What is claimed is:

1. A blade/vane cascade segment of a blade/vane cascade for a turbomachine, wherein the blade/vane cascade segment comprises a stage with a stage surface as well as a first blade/vane element and a second blade/vane element;
   wherein the stage surface comprises a first elevation reaching as far as the pressure side of the first blade/vane element and a second elevation reaching as far as the suction side of the second blade/vane element; and
   wherein a boundary of the second elevation has at least one furthest downstream point, whose axial position differs from an axial position of at least one highest point of the first elevation by a maximum of 10% of an axial cascade span of the blade/vane cascade segment.

2. The blade/vane cascade segment as claimed in claim 1, wherein a boundary of the first elevation comprises:
   at least one furthest downstream point, which is arranged at least 50% and/or at most 85% of the axial cascade span downstream from the leading edges of the blade/vane elements; and/or
   at least one furthest upstream point, which is arranged at most 10% or at most 5% of the axial cascade span downstream from the leading edges of the blade/vane elements.

3. The blade/vane cascade segment as claimed in claim 1, wherein the boundary of the second elevation has at least one furthest upstream point whose axial position is arranged at most 10% or at most 5% of the axial cascade span downstream from the leading edges of the blade/vane elements.

4. The blade/vane cascade segment as claimed in claim 1, wherein an axial extension of the first elevation is at least twice as large as an axial extension of the second elevation.

5. The blade/vane cascade segment as claimed in claim 1, wherein
   a distance between the at least one highest point of the first elevation and the pressure side of the first blade/vane element, measured in a peripheral direction, and/or
   a distance between at least one highest point of the second elevation and the suction side of the second blade/vane element, measured in a peripheral direction (U),
   equals at most 10% of a pitch distance of the blade/vane cascade segment.

6. The blade/vane cascade segment as claimed in claim 1, wherein a maximum extension of the first elevation in a peripheral direction
   equals at most two-thirds of a pitch distance of the blade/vane cascade segment and/or
   equals at least one-quarter of the pitch distance of the blade/vane cascade segment.

7. The blade/vane cascade segment as claimed in claim 1, wherein an extension of the second elevation in a peripheral direction equals at most one-fifth of a pitch distance of the blade/vane cascade segment.

8. The blade/vane cascade segment as claimed in claim 1, wherein the stage surface has a depression which extends as far as the suction side of the second blade/vane element downstream from the second elevation.

9. The blade/vane cascade segment as claimed in claim 8, wherein an axial position of at least one lowest point of the depression differs from the axial position of at least one highest point of the first elevation by a maximum of 15% of the axial cascade span.

10. The blade/vane cascade segment as claimed in claim 8, wherein a furthest upstream point of a boundary of the depression is situated at most 5% of the axial cascade span downstream from the leading edges of the blade/vane elements, has one axial position in common with the leading edges or is arranged upstream from the leading edges of the blade/vane elements, and can extend as far as the stage edge on the inflow side.

11. The blade/vane cascade segment as claimed in claim 1, wherein the blade/vane cascade is a guide vane cascade or a rotating blade cascade.

12. The blade/vane cascade segment, as claimed in claim 1, wherein at least one of the blade/vane cascade segments are configured and arranged in a blade/vane cascade.

13. The blade/vane cascade segment as claimed in claim 12, wherein at least one blade/vane cascade are configured and arranged in a turbomachine.

14. The blade/vane cascade segment as claimed in claim 1, wherein the blade/vane cascade segment and a side wall situated opposite the stage of the blade/vane cascade segment bound a blade/vane channel of a turbomachine.

15. The blade/vane cascade segment as claimed in claim 1, wherein the stage is configured and arranged to border on the blade/vane elements in a peripheral direction.

* * * * *